United States Patent

Blahut et al.

[11] Patent Number: 6,065,061
[45] Date of Patent: May 16, 2000

[54] INTERNET PROTOCOL BASED NETWORK ARCHITECTURE FOR CABLE TELEVISION ACCESS WITH SWITCHED FALLBACK

[75] Inventors: Donald Edgar Blahut, Holmdel, N.J.; James D. Bobeck, Leesport, Pa.; Robert William Dalton, North Andover, Mass.; Enrique Hernandez-Valencia, Highlands; Roger Henry Levy, Berkeley Heights Township, Union County, both of N.J.; Ronald L. Sharp, Califon, N.J.

[73] Assignee: Lucent Technologies Inc., Murray Hill, N.J.

[21] Appl. No.: 08/991,735

[22] Filed: Dec. 16, 1997

[51] Int. Cl.[7] .................................................... H04J 3/16
[52] U.S. Cl. .............................................. 709/239; 709/203
[58] Field of Search .................................. 709/203, 238, 709/239; 714/4, 48

[56] References Cited

U.S. PATENT DOCUMENTS

| | | | |
|---|---|---|---|
| 4,964,120 | 10/1990 | Mostashari | 370/14 |
| 5,420,857 | 5/1995 | Jurkevich | 370/60 |
| 5,479,650 | 12/1995 | Archibald et al. | 395/575 |
| 5,539,449 | 7/1996 | Blahut et al. | 348/7 |
| 5,550,820 | 8/1996 | Barau | 370/60.1 |
| 5,675,732 | 10/1997 | Majeti et al. | 395/200.01 |
| 5,764,624 | 6/1998 | Endo et al. | 370/218 |
| 5,790,806 | 8/1998 | Koperda | 395/200.82 |
| 5,819,036 | 10/1998 | Adams et al. | 395/200.33 |
| 5,835,727 | 11/1998 | Wong et al. | 395/200.68 |
| 5,870,134 | 9/1999 | Laubach et al. | 348/12 |
| 5,884,024 | 3/1999 | Lin et al. | 395/187.01 |
| 5,894,479 | 4/1999 | Mohammed | 370/401 |
| 5,903,558 | 5/1999 | Jones et al. | 370/351 |
| 5,930,247 | 7/1999 | Miller, II et al. | 370/338 |
| 5,987,524 | 11/1999 | Yoshida et al. | 709/245 |
| 5,991,308 | 11/1999 | Fuhrmann et al. | 370/474 |

*Primary Examiner*—Mehmet B. Geckil
*Attorney, Agent, or Firm*—J. J. Opalach

[57] ABSTRACT

A user accesses the Internet through a hybrid data communications system architecture in which upstream service is provided via the local loop of the public switched telephone network (PSTN) and downstream service is provided via a cable television (CATV) network. The Cable Modem Data Termination system (CMTS) includes a routing table. Upon detection of a CATV service interruption, the CMTS re-routes IP traffic destined for a destination IP address (IP1) associated with the user to a different IP address, or endpoint, as a function of the routing table. In this instance, the different IP address is associated with equipment that provides downstream IP service to the user via the local loop of the PSTN.

2 Claims, 3 Drawing Sheets

INTERNET PROTOCOL BASED NETWORK ARCHITECTURE FOR CABLE TELEVISION ACCESS WITH SWITCHED FALLBACK

CROSS-REFERENCE TO RELATED APPLICATIONS

Related subject matter is disclosed in the following co-pending, commonly assigned, U.S. patent applications of Bobeck et al., Ser. No. 08/852971, filed on Jun. 14, 1996; and Heer et al., Ser. No. 08/837423, filed on Jun. 14, 1996.

FIELD OF THE INVENTION

This invention relates generally to communications and, more particularly, to packet communications systems.

BACKGROUND OF THE INVENTION

Today, access to the Internet is available to a wide audience through the public switched telephone network (PSTN). Typically, in this environment, a user accesses the Internet though a full-duplex dial-up connection through a PSTN modem, which may offer data rates as high as 56 thousand bits per second (56 kbps) over the local-loop plant.

However, in order to increase data rates (and therefore improve response time), other data services are either being offered to the public, or are being planned, such as data communications using full-duplex cable television (CATV) modems, which offer a significantly higher data rate over the CATV plant than the above-mentioned PSTN-based modem. In addition, hybrid networks, where the amount of bandwidth available in one direction of the connection is significantly higher than on the reverse direction, are being -planned. In a hybrid network, the user accesses the Internet by transmitting data via a PSTN-based modem and receiving data via the CATV-based modem. This hybrid network is based upon a model where in the upstream direction, i.e., to the Internet, the amount of data to be transmitted is small—hence a lower data rate is permissible—whereas in the downstream direction, i.e., from the Internet, the amount of data to be received is large—hence a higher data rate is desirable.

Irrespective of the data communications architecture, when accessing the Internet an Internet Protocol (IP) address is associated with the endpoint receiving the data. For example, in the above mentioned hybrid architecture, downstream IP packets are transmitted to an IP address associated with the CATV equipment that provides the data to the end user. Consequently, the user experiences an interruption in service when a fault occurs in the CATV plant.

SUMMARY OF THE INVENTION

Therefore, and in accordance with the invention, we provide a fall-back technique for use in any IP-based data communications architecture. In particular, a routing table specifies alternate IP connections in the event of a service interruption. As a result, a user is not aware of a service interruption other than, perhaps, experiencing an increase in response time in some situations due to a drop in data rates.

In an embodiment of the invention, a user accesses the Internet through a hybrid data communications system architecture in which upstream service is provided via the local loop of the PSTN and downstream service is provided via a CATV network. The Cable Modem Data Termination system (CMTS) includes a routing table. Upon detection of a CATV service interruption, the CMTS re-routes IP traffic destined for a first destination IP address (IP1) associated with the user to a different IP address (IP2), or endpoint, as a function of the routing table. In this instance, the IP2 address is associated with equipment that provides downstream IP service to the user via the local loop of the PSTN.

DETAILED DESCRIPTION

Figure 1:
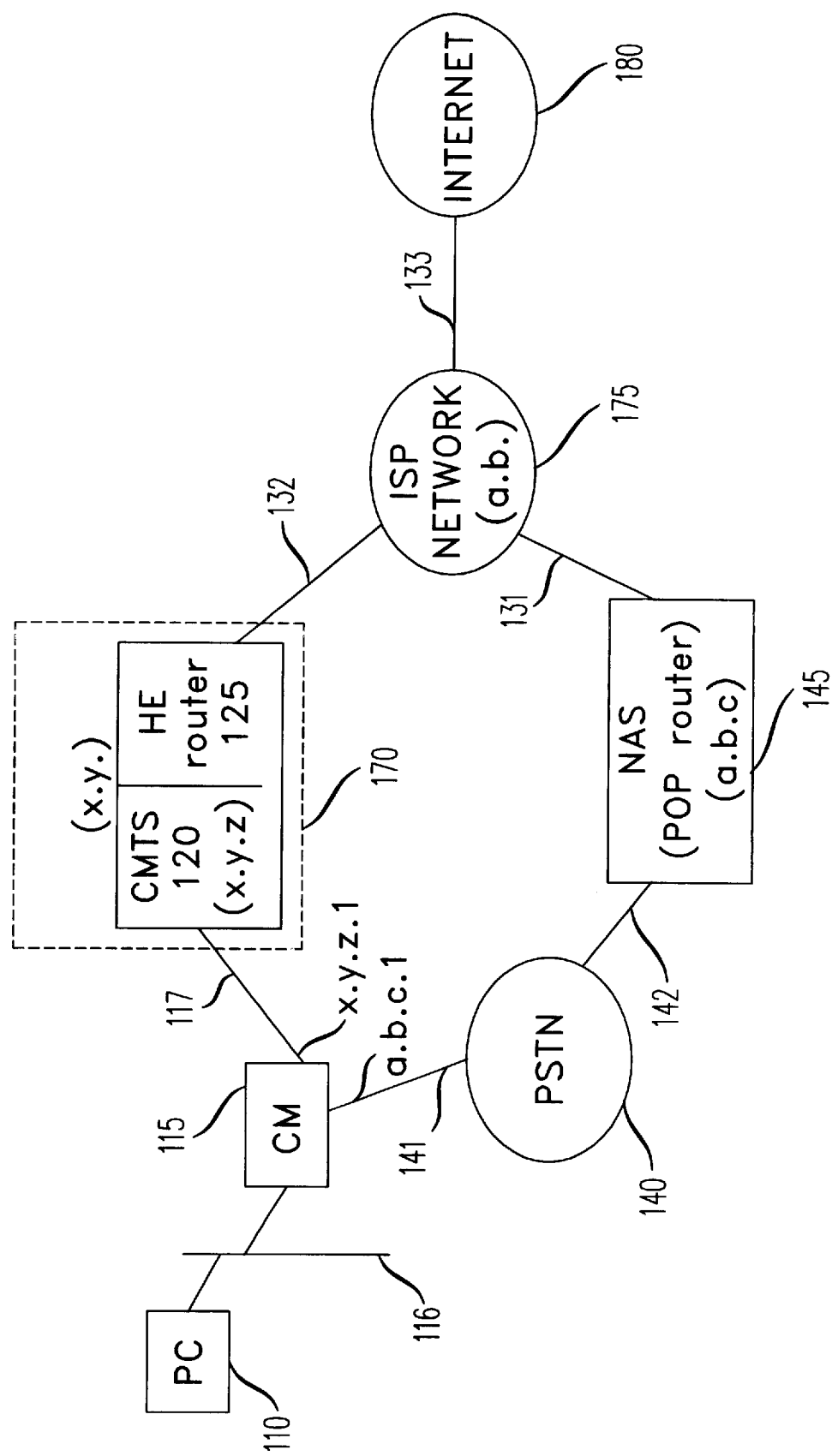
FIG. 1 shows an illustrative hybrid data communications system embodying the principles of the invention.

An illustrative communications system embodying the principles of the invention is shown in FIG. 1. Other than the inventive concept, the elements shown in FIG. 1 are well-known and will not be described in detail. Also, although the illustrative embodiment is representative of a hybrid network architecture, the inventive concept is applicable to any IP-based network architecture.

As noted above, communications system 100 is representative of a hybrid network architecture in which a user associated with PC 110 accesses Internet services. In particular, PC 110 (also referred to herein as a "home appliance") provides upstream transmissions via PSTN 140 and receives downstream transmissions via a CATV network. Cable TV network access is provided by an MSO (Multi-Service Operator) (not shown). In this context, it is assumed the MSO provides (besides the traditional CATV access network facilities exemplified by communications link 117) CATV head-end 170 and cable modem 115. This CATV network arrangement is also referred to herein as a cable data network (CDN). PC 110 is representative of data terminal equipment and is coupled via communications link 116 to cable modem (CM) 115. Communications link 116 is representative of well-known interconnection technology between a data terminal equipment and data communications equipment, e.g., an ethernet local area network (LAN) connection such as 10 BaseX or a PC bus. CM 115 provides the access interface to the CDN for downstream transmission and the PSTN for upstream transmission. (As is known in the art, some 2-way traffic may be required over the PSTN and CDN networks, e.g., between cable modem 115 and opposing data communications equipment, for connection initialization and control purposes but this traffic is transparent to PC 110.)

Internet access is provided by an Internet Service Provider (ISP). In the context of FIG. 1, it is assumed an ISP provides ISP network 175, which includes a CDN access router (not shown) attached to communications link 132, and network access server (NAS) 145, which includes a point-of-presence (POP) router as known in the art. Although NAS 145 and CATV head-end 170 could be co-located, it is assumed for this example that NAS 145 is not co-located with CATV head-end 170. For example, it is assumed that the above-mentioned MSO and ISP Service provider are different entities even though this is not relevant to the inventive concept.

In the downstream direction, CM 115 is coupled to CATV head-end 170 via cable facility 117, which is, e.g., a CATV radio-frequency (RF) coax drop cable and associated facilities. CATV head-end 170 provides services to a plurality of downstream users (not shown) and comprises cable modem data termination system (CMTS) 120 and head-end (HE) router 125. (CMTS 120 is coupled to HE router 125 via an Ethernet 100BaseX connection (not shown).) CMTS 120 terminates the CATV RF link with CM 115 and implements data link protocols in support of the provided residential service (described below). Given the broadcast characteristics of the RF link, multiple residential customers and, hence, potentially many home-based LANs may be serviced from the same CMTS interface. (Also, although not shown, it is assumed that the CATV network includes a plurality of CMTS/HE router pairs.)

In the upstream direction, CM 115 is coupled to NAS 145 via PSTN 140, and telecommunications facilities 141 and 142. The latter are illustratively, local loops.

Figure 2:
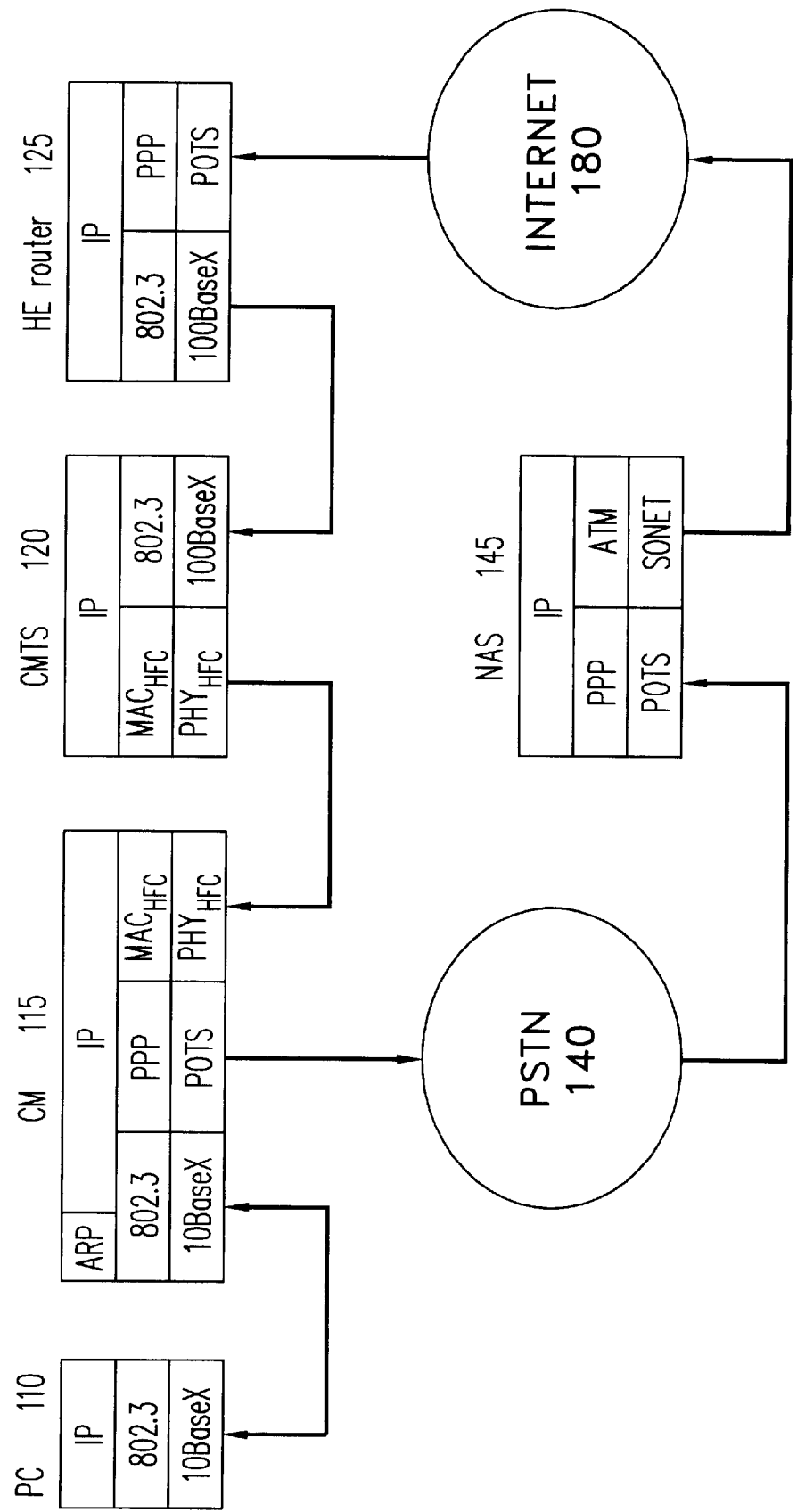
FIG. 2 shows an alternative "protocol stack" view of the hybrid communications system of FIG. 1.

Another view of the communications system of FIG. 1 is shown in FIG. 2, which illustrates the associated communications stacks (as known in the art). The IP communications between PC 110 and CM 115 is supported by IEEE 802.3 over an Ethernet 10BaseX connection. In addition, CM 115 supports an address resolution protocol (ARP). The IP communications between CM 115 and NAS 145 is supported by the point-to-point protocol (PPP) over the plain-old-telephone-service (POTS). The IP communications between CM 115 and CMTS 120 is supported by the media access control (MAC) protocol over a hybrid-fiber-coax physical layer ($PHY_{HFC}$). The IP communications between CMTS 120 and HE router 125 is supported by IEEE 802.3 over an Ethernet 100BaseX connection. The IP communications between HE router 125 and Internet 180 is supported by asynchronous transfer mode (ATM) over a synchronous optical network (SONET). The IP communications between NAS 145 and Internet 180 is supported by asynchronous transfer mode (ATM) over a synchronous optical network (SONET).

In this approach, CM 115 and CMTS 120 are routers such that CMTS 120 does not need to be aware of the MAC address of the home appliance (PC 110). As such, MAC address resolution is supported by CM 115 as shown in FIG. 2 with CM 115 supporting ARP. (It should be noted that IP address resolution could also be supported by a different device (not shown) on the home LAN). In this example, it is assumed that CM 115 is able to ARP for the MAC address of a target home appliance (or, provide any other mechanism to associate a MAC address to a home appliance IP address). This type of architecture enables CMTS 120 to treat its connection to the CM 115 as a virtual point-to-point link.

As described above, this hybrid architecture supports downstream communications over the CATV network and upstream communications over the PSTN by associating different IP subnetworks with each of the different cable modem interfaces. Specifically, the CATV interface of CM 115 is logically associated with the IP subnetwork of CMTS 120. This assignment establishes the logical point of attachment of the cable modem to the CDN. (In this example, it is assumed that each home IP subnetwork is associated with a particular CMTS/HE router pair of the CATV network. For simplicity, and as noted above, only one CMTS/HE router pair is shown in FIGS. 1 and 2). Similarly, the PSTN interface of CM 115 is logically associated with the IP subnetwork of NAS 145. For example, the IP address of CM 115 associated with CMTS 120/HE router 120 is xy.z.1, where the x.y portion represents the network address prefix (here the CDN network), and the portion x.y.z represents a particular subnetwork prefix. Similarly, with respect to NAS 145, the IP address of CM 115 is a.b.c. 1, where the a.b portion represents the network address prefix (here the ISP network), and the portion a.b.c represents a particular subnetwork prefix. This assignment establishes the logical point of attachment of the cable modem to the PSTN. Given that the CDN provides the path for the downstream information rather than the PSTN link, PC 110 uses IP addresses that have the IP subnetwork address identifier of the CMTS 120 as a prefix when communicating with target destinations, e.g., an endpoint (not shown) coupled to Internet 180. In this context, CMTS 120 is also known as the "homing" CMTS with respect to PC 110. As such, home appliances appear to the external world as IP subnetworks of the homing CMTS/HE router. For example, assume that IP1 is representative of the subnetwork address of CMTS 120 and that IP2 is representative of the subnetwork address NAS 145. As known in the art, an IP packet comprises (among other elements) a "source IP address" field to identify the sender and a "destination IP address" field to identify the endpoint. Here, in transmitting IP packets upstream, PC 110 uses IP1 as a prefix value of the "source IP address" field, not IP2. These upstream IP packets are routed, e.g., by ISP Network 175, to the endpoint associated with the value of the "destination field" in these IP packets. The endpoint responds with traffic using the value in the received "source IP address" field, which in this case includes IP1 as a prefix value. As a result, the ISP Network 175 routes this downstream traffic to IP1, which uses the CDN. (For additional information with respect to inter-domain routing see, e.g., "Classless Inter-Domain Routing (CDIR): an Address Assignment and Aggregation Strategy," Internet Engineering Task Force (IETF) Request for Comment (RFC) 1519, Sep. 1993, by Fuller et al.)

This approach significantly simplifies Operations, Administration, Maintenance and Provisioning (OAM&P) requirements for the CDN service provider since supporting data services over the CATV network, including IP multicast, is then not any different than supporting IP services over a conventional router network. Another benefit from this approach is that the IP routing table size (described below) for the CMTS grows proportionally to the number of RF links, rather than proportional to the number of CMs or home appliances, by making all home LANs share the IP subnetwork prefix of the homing CMTS.

An "Internet connection" is established as in the prior art by, e.g., the user at PC 110 "dialing" a predetermined telephone number associated with NAS 145. The latter couples the user at PC 110 to Internet 180 subsequent to appropriate initialization procedures as known in the art, e.g., data communications equipment handshaking, security verification via, e.g., a "log-on" procedure, etc. (For simplicity, the corresponding data communications equipment located within NAS 145 is not shown).

Under normal operating conditions, outbound traffic from PC 110 is forwarded to CM 115. After the above-mentioned initial set up of a point-to-point link to the subscribed ISP over the PSTN, including appropriate authentication and authorization steps, CM 115 relays such upstream traffic to NAS 145 via PSTN 140. Such upstream traffic finds its way to its intended destination (not shown) by standard IP routing procedures invoked by ISP Network 175 and other ISPs (not shown). Downstream traffic bound to PC 110 is forwarded to CM 115 via CMTS 120. In this context, the link between CMTS 120 and CM 115 via cable link 117 is referred to as the primary communications channel.

Unfortunately, should the cable link to CM 115 fail, then CMTS 120 can no longer forward IP traffic addressed to PC 110. Therefore, and in accordance with the invention, we provide a fall-back technique for use in any IP-based data communications architecture. In particular, a routing table specifies alternate IP connections in the event of a service interruption. As a result, a user is not aware of a service interruption other than, perhaps, experiencing an increase in response time in some situations due to a drop in data rates.

Figure 3:
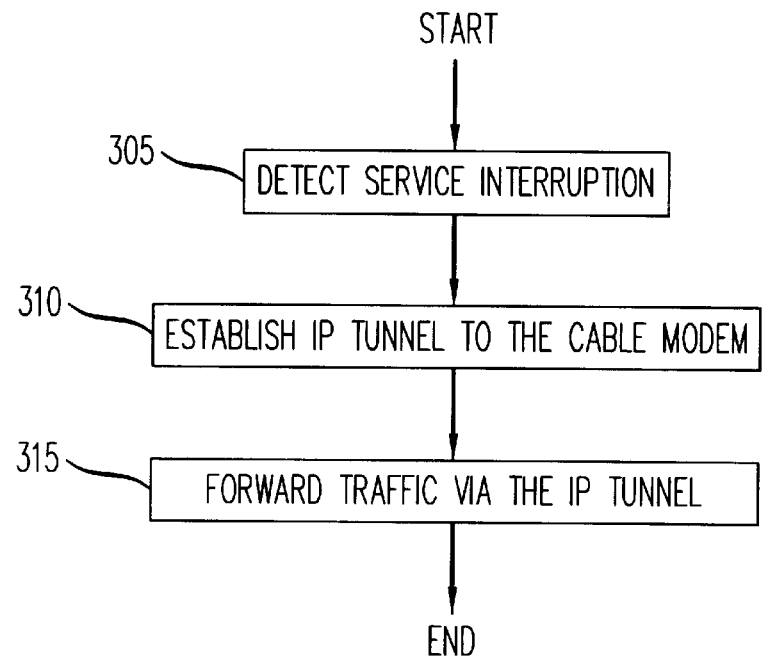
FIG. 3 shows an illustrative method embodying the principles of the invention.

An illustrative method embodying the principles of the invention is shown in FIG. 3. In step 305, CMTS 120 detects a service interruption with respect to the downstream cable link to CM 115. (Cable Network management/monitoring functions are well-known and will not be described herein). Following detection of the service interruption, CMTS 120 establishes an IP tunnel to CM 115 in step 310 (described further below). In this example, the IP tunnel allows CMTS 120 to re-route any downstream traffic to CM 115 via the PSTN 140. In step 315, CMTS 120 forwards traffic via this IP tunnel to CM 115. The latter extracts the traffic from the tunnel and "relays" it to the respective home appliance. In this context, the link between CMTS 120 and CM 115 via PSTN 140 is referred to as the secondary communications channel. Note also that the CMTS IP tunnel to the CM may also be established during the CM log-on procedure to further expedite packet forwarding during re-routes.

In order to perform this routing, CMTS 120 must know the IP address of CM 115 associated with the PSTN-side of the connection. As such, a routing table is stored within CMTS 120, e.g., within memory (not shown). An example of such a routing table is shown in Table 1, below.

TABLE 1

CMTS Routing Table

| CM IP Address | RF Port ID | CM Tunnel IP Address |
|---|---|---|
| x.y.z.1 | RF Port ID #n | a.b.c.1 |
| . | . | . |
| . | . | . |
| . | . | . |
| x.y.z.k | RF Port ID #m | a.b.c.j |

In Table 1, each CM is associated with 1) an IP address on the CDN, 2) an associated RF port identification (ID) on the CDN, and 3) an associated alternative IP address for use during a service interruption. As described above, the IP address associated with the CM has a prefix value equal to the IP subnetwork address identifier of the "homing" CMTS. In this example, the IP address of CM 115 has a prefix value (x.y.z) equal to the IP subnetwork address identifier of CMTS 120. The RF port ID associates the CM IP, at the physical level, with a particular port of CMTS 120. The CM Tunnel IP is the value of the IP address associated with the PSTN-side of the connection and has a prefix value equal to the IP subnetwork address identifier of NAS 145 (a.b.c). As noted earlier, since there is only one such entry per CM, independently of the number of local appliances served by the CM, the management of this table is greatly simplified (in terms of size and look up time).

The values populating the routing table, and particularly the CM Tunnel IP address value, are either statically determined or dynamically determined. In the former case, the IP address associated with the PSTN-side of the connection is entered into the table during administration of the account associated with the user of PC 110. That is, an administrator (not shown) not only enters the IP address associated with the CDN-side into the system (as is currently performed), but also populates the routing table with the required values for the CM Tunnel IP Address. In the latter case, upon the initiation of a connection between NAS 145 and CM 115, CM 115 provides, via IP, a MAC HFC control message to CMTS 120, wherein the control message specifies the PSTN-side IP address associated with CM 115. (MAC HFC control messages are known in the art.) Again, this information is known a priori to CM 115, as described above, since the user must have an IP address assigned by the ISP. As a result of the above routing table, CMTS 120 is able to identify the homing NAS in the ISP network to open an IP tunnel to redirect downstream traffic.

It should be noted that in the case of dynamically creating the routing table, table entries can also be dynamically removed any number of ways. For example, a table entry for a particular CM is removed upon receipt of a termination message from the CM (which, as upstream traffic, is transmitted over the PSTN-side of the connection). This ability to remove table entries for an IP endpoint provides a mechanism to limit the size of the routing table.

Figure 4:
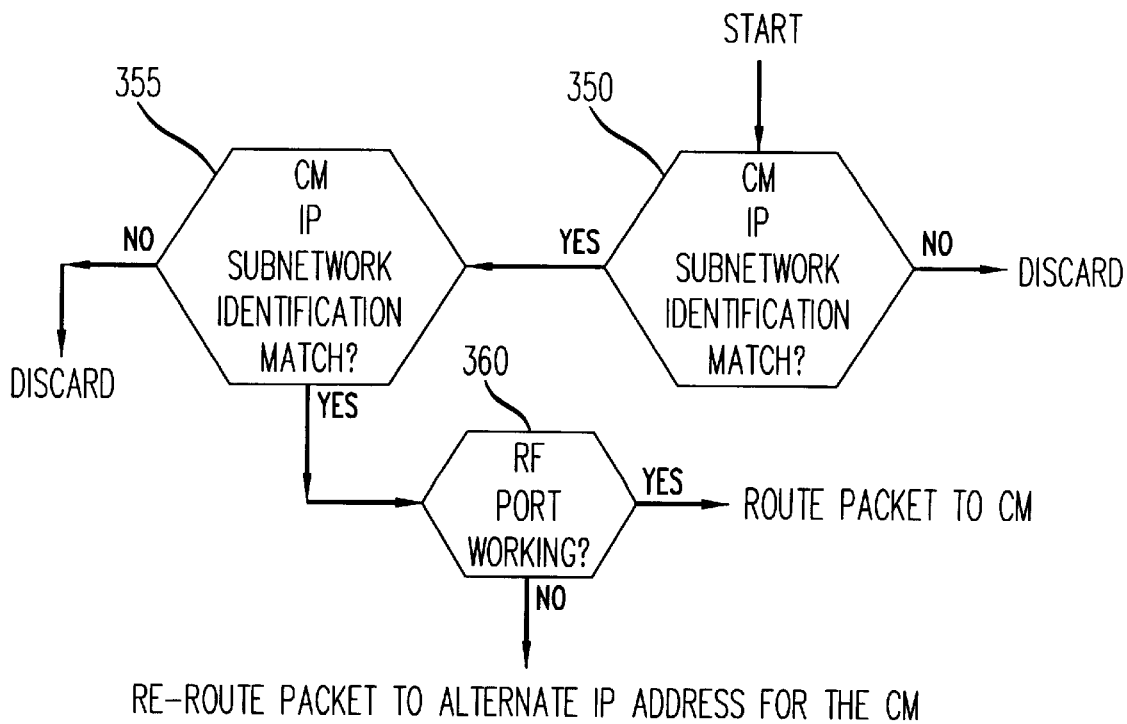
FIG. 4 shows another illustrative method embodying the principles of the invention.

An illustrative method for processing downstream traffic for use in CMTS 120 in accordance with the principles of the invention is shown in FIG. 4. In step 350, CMTS 120 receives an IP packet and determines if that portion of the destination IP address matches the a priori IP subnetwork address identifier for CMTS 120. If there is no match, CMTS 120 discards the received packet(s). (Alternatively, the received packet(s) may be routed to the next hop router (depending on whether the CMTS acts as either a packet bridge or a router).) If there is a match, CMTS 120 compares that portion of the destination IP address to the routing table, in step 355, to determine if there is a match to an associated CM IP address served by CMTS 120. If there is no match, CMTS 120 discards the received packet. If there is a match, CMTS 120 checks on the status of the associated RF port ID in step 360. If the associated RF port ID is working, CMTS 120 routes the IP packet to the respective CM. If the associated RF port ID is unavailable, e.g., because of a hardware failure in that portion of the CATV plant, then CMTS 120 re-routes the IP packet to the alternate IP address indicated by the value in the "CM Tunnel IP" field.

In re-routing the downstream traffic, CMTS 120 encapsulates the received IP packet into another IP packet. The encapsulated IP packet is transmitted over HE router 125 for eventual routing to the PSTN, via the ISP modem pool (not shown) of NAS 145. In this encapsulation process, CMTS 120 uses its own IP address as the source IP address for the re-route packet and the CM tunnel IP address, which is the IP address of the CM on the PSTN-side of the connection (illustrated here by CM 115) as the destination IP address. The original IP packet is carried as the user data in the re-route packet. At the CM, the original IP packet is extracted from the payload of the re-routed packet. (IP encapsulation is known in the art, e.g., see "Generic Routing Encapsulation," IETF RFC 1701, October 1994, by S. Hanks et al.; "IP in IP Tunneling," IETF RFC 1853, October 1995 by W. Simpson; "IP Encapsulation within IP," IETF RFC 2003, October 1996 by C. Perkins.)

In the case of shared media communications (Broadcast) or multicast group communications, the inventive concept is realized by enlarging the routing table entries to incorporate multicast group members as shown in Table 2, below. More specifically, a CM IP address is mapped to a plurality of RF port IDs (each of which represents a different CM) and a plurality of CM Tunnel IP addresses as illustrated in Table 2 by CM IP Address Z. This CM IP address is also know as the multicast group IP address.

TABLE 2

CMTS Routing Cache Table - Multicast/Broadcast

| CM IP Address | RF Port ID | CM Tunnel IP Address |
|---|---|---|
| IP Address X | RF Port ID #n | IP Address K |
| . | . | . |
| . | . | . |
| . | . | . |
| IP Address Y | RF Port ID #m | IP Address L |
| IP Address Z | RF port ID #x | IP Address M |
| (multicast group 1) | RF port ID #m | IP Address N |
|  | RF Port ID #l | IP address O |

As shown in Table 2, three RF ports (with identifications #x, #m and #l) are associated with multicast group 1. Note that an RF port can be associated to both unicast and multicast connections simultaneously. When a CM needs to send data to all members of a group, it may do so by using the destination address of the multicast group. The CMTS, after receiving such packets, forwards them over the RF ports indicated in the routing table. Multicast group management is performed as appropriate to each specific CATV MAC protocol, for instance, ADAPt+. In accordance with the invention, should there be a service disruption on the CDN, the downstream IP traffic to the multicast group is re-routed to the listed plurality of CM Tunnel IP Addresses, each of which correspond to a respective PSTN-side IP address of the respective CMs.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was illustrated herein as being implemented with discrete functional building blocks, e.g., an HE router, the functions of any one or more of those building blocks can be carried out using one or more appropriately programmed processors, e.g., a digital signal processor. Similarly, although the inventive concept was described in the context of using a CM and CMTS as a router, the invention is also applicable to networks in which the CM and CMTS act as bridges, or repeaters. This requires that the CMTS be able to resolve a MAC address of a home appliance from the IP address of the home appliance. As such, routing table requirements grow proportionally to the number of home appliances to be supported.

Also, the inventive concept is applicable to other residential access technologies such as Asymmetric Subscriber Digital Link (ADSL), Passive Optical Networks (PON), wireless networks, satellite networks, etc.

What is claimed:

1. A method for use in providing Internet service to an endpoint, the method comprising the steps of:

specifying routing information for an endpoint, wherein the routing information specifies primary and alternative Internet Protocol (IP) addresses; and communicating data to the endpoint using the specified primary IP address except during periods of service interruption in which one of the alternative IP addresses are used wherein the communicating data step further comprises the steps of:

receiving an IP packet that includes a destination field, the value of which matches a subnetwork address identifier within the primary IP address;

determining if a communications channel to the primary IP address is available;

if the communications channel is available, routing the received IP packet to the primary IP address; and if the communications channel is not available, routing the received IP packet to one of the alternative IP addresses.

2. A method for use in providing Internet service to an endpoint via a primary communications channel, the method comprising the steps of:

storing a routing table comprising an first Internet Protocol (IP) address associated with routing data to an endpoint via the primary communications channel and a second IP address associated with routing data to the endpoint over a secondary communications channel; and routing data to the endpoint as a function of the routing table such that during periods of service interruption on the primary communications channel data is routed to the endpoint via the secondary communications channel, whereas data is routed to the endpoint via the primary communications channel otherwise wherein the routing data step further comprises the steps of:

receiving an IP packet that includes a destination field, the value of which matches a subnetwork address identifier within the first IP address;

determining if the primary communications channel is available;

if the primary communications channel is available, routing the received IP packet to the first IP address; and if the primary communications channel is not available, routing the received IP packet to the second IP address.

* * * * *